(12) United States Patent
Sivaramakrishna Iyer

(10) Patent No.: US 8,826,412 B2
(45) Date of Patent: *Sep. 2, 2014

(54) AUTOMATIC ACCESS TO NETWORK DEVICES USING VARIOUS AUTHENTICATION SCHEMES

(75) Inventor: Krishnan Sivaramakrishna Iyer, Cary, NC (US)

(73) Assignee: Riverbed Technology, Inc., San Francisco, CA (US)

(*) Notice: Subject to any disclaimer, the term of this patent is extended or adjusted under 35 U.S.C. 154(b) by 116 days.

This patent is subject to a terminal disclaimer.

(21) Appl. No.: 13/556,174

(22) Filed: Jul. 23, 2012

(65) Prior Publication Data
US 2012/0291112 A1 Nov. 15, 2012

Related U.S. Application Data

(63) Continuation of application No. 11/503,554, filed on Aug. 11, 2006, now Pat. No. 8,230,491.

(60) Provisional application No. 60/709,770, filed on Aug. 19, 2005.

(51) Int. Cl.
*H04L 29/06* (2006.01)
*H04L 12/24* (2006.01)
*H04L 29/08* (2006.01)

(52) U.S. Cl.
CPC ............ *H04L 12/24* (2013.01); *H04L 41/0813* (2013.01); *H04L 69/18* (2013.01); *H04L 41/085* (2013.01); *H04L 63/205* (2013.01); *H04L 41/00* (2013.01); *H04L 63/083* (2013.01); *H04L 41/0213* (2013.01); *H04L 67/16* (2013.01)

USPC .......... 726/12; 709/208; 709/220; 709/221; 370/252; 370/389; 713/168; 713/165

(58) Field of Classification Search
CPC .................... H04L 63/0281; H04L 29/08072
USPC ............................................................ 726/12
See application file for complete search history.

(56) References Cited

U.S. PATENT DOCUMENTS 5,930,792 A * 7/1999 Polcyn ........................ 715/234
6,233,565 B1 * 5/2001 Lewis et al. ................... 705/35

(Continued)

OTHER PUBLICATIONS

Design and Implementation of Sun Network Filesystem|http://ece.ut.ac.ir/Classpages/S90/ECE404/nfs.pdf|Sandberg et al|1985|pp. 118-130.*

*Primary Examiner* — Mahfuzur Rahman
(74) *Attorney, Agent, or Firm* — Park, Vaughan, Fleming & Dowler LLP

(57) ABSTRACT

An access discovery method and system discovers and stores the proper access protocol for each device on a network. The discovery process includes progressively sequencing through state transitions until a successful access protocol sequence is determined, and an access script corresponding to this sequence is stored for subsequent access to the device. Preferably, the protocol-discovery algorithm is modeled as a state table that includes a start state and two possible terminal states: success and failure. A state machine executes the state table until a terminal state is reached; if the terminal state is a failure, the system backtracks to attempt an alternative sequence. The process continues until the success state is reached or until all possible sequences are executed without success. An exemplary state model is provided that has been shown to be effective for modeling network devices from a variety of vendor devices.

24 Claims, 4 Drawing Sheets

(56) References Cited

U.S. PATENT DOCUMENTS

| | | | |
|---|---|---|---|
| 6,678,835 B1 * | 1/2004 | Shah et al. | 714/4.12 |
| 6,708,187 B1 * | 3/2004 | Shanumgam et al. | 1/1 |
| 7,086,086 B2 * | 8/2006 | Ellis | 726/15 |
| 7,370,296 B2 * | 5/2008 | Koyfman et al. | 716/104 |
| 2005/0047350 A1 * | 3/2005 | Kantor et al. | 370/254 |
| 2006/0161616 A1 * | 7/2006 | I'Anson et al. | 709/203 |
| 2006/0200800 A1 * | 9/2006 | Melby | 717/114 |

\* cited by examiner

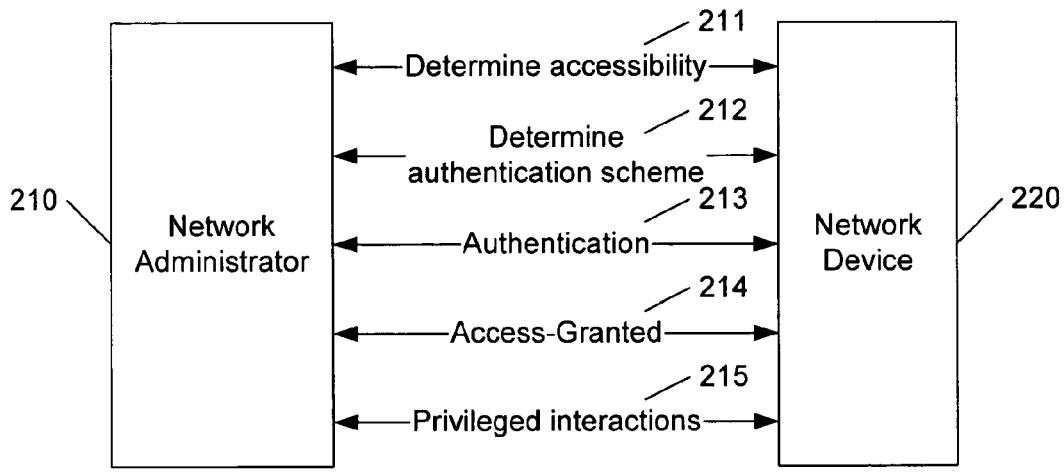
FIG. 1A  FIG. 1B
FIG. 2
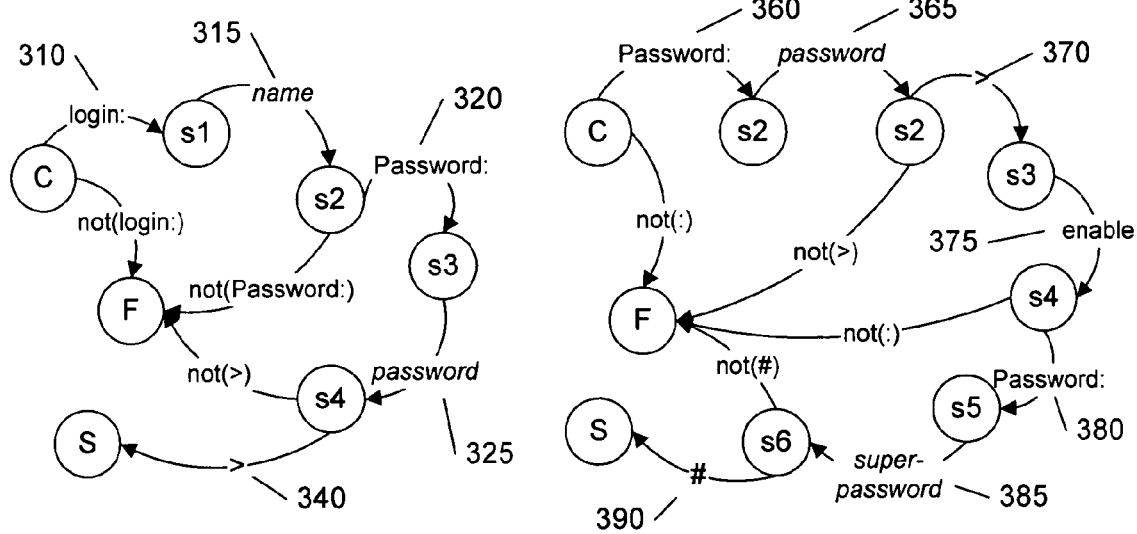
FIG. 3A  FIG. 3B

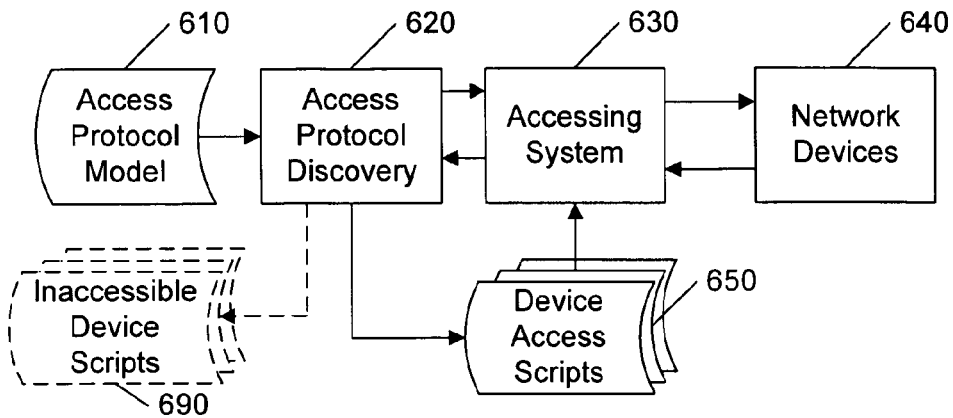

FIG. 6

```
- <fs:cp name="GeneratedScript_0">                    /710
  - <fs:cp name="VNE Managed">                /720
    - <fs:cp name="CONNECT_STATE">
       <fs:sp name="initial prompt">password:|enter password:</fs:sp>
    </fs:cp>                            /730
    - <fs:cp name="PASSWORD_STATE">
       <fs:sp name="send command">password</fs:sp>
       <fs:sp name="expected prompt">>|>|#|\$|:5#</fs:sp>
    </fs:cp>                       /740
    - <fs:cp name="ENABLE_STATE">
       <fs:sp name="send command">enable</fs:sp>
       <fs:sp name="expected prompt">password:|enter password:|#</fs:sp>
    </fs:cp>                                /750
    - <fs:cp name="ENABLE_PASSWORD_STATE">
       <fs:sp name="send command">superpassword</fs:sp>
       <fs:sp name="expected prompt">#|>(enable)|>|ces#|>|#|\$|:5#</fs:sp>
    </fs:cp>
  </fs:cp>
</fs:cp>
```

FIG. 7

AUTOMATIC ACCESS TO NETWORK DEVICES USING VARIOUS AUTHENTICATION SCHEMES

CROSS-REFERENCE TO RELATED APPLICATIONS

This application is a continuation of U.S. patent application Ser. No. 11/503,554, entitled "AUTOMATIC ACCESS TO NETWORK DEVICES USING VARIOUS AUTHENTICATION SCHEMES," filed Aug. 11, 2006 now U.S. Pat. No. 8,230,491, which claims the benefit of U.S. Provisional Patent Application 60/709,770, filed 19 Aug. 2005, both of which are incorporated by reference in their entirety.

BACKGROUND

This invention relates to the field of network management, and in particular to a system that facilitates access to network devices using a variety of authentication/access schemes.

To adequately manage a network, access must often be gained to devices of the network, to determine and/or modify their configuration, obtain diagnostic information, monitor their performance, and so on.

In order to gain access to a network device, an authentication process is typically required, which generally includes the execution of a pre-defined access protocol. The access protocol is generally specific to each device, or device type, as determined by the vendor, and is also often dependent upon the particular configuration of the device, such as whether it is configured for Telnet, Secure Shell, or SNMP, and so on.

FIGS. 1A and 1B illustrate examples of two different access/authentication protocols for gaining access to two different network devices (in this example, a JUNIPER device and a CISCO device, respectively) that are configured to provide access via Telnet.

In FIG. 1A, after communication is established, the device provides an initial prompt ("login:") 110, to which the user desiring access responds with a predefined user name 115. The device responds with another prompt ("Password:") 120, to which the user responds with a predefined password 125. If the login name and password are recognized by the device as being authorized to grant access, the device responds with an identification stream 130, and terminates the stream 130 with a prompt symbol (">") 140, to which the user can respond with a specific query or command. If the login name and password are not recognized, the device generally responds with an error message and reissues the login prompt ("login:").

In FIG. 1B, a different protocol is used; in this protocol, the device provides an initial prompt ("Password:") 160, to which the user responds with a predefined password 165. If the device recognizes the password, the device issues a subsequent prompt (">") 170. In this particular example device, there are two levels of user access, commonly termed 'user' and 'super-user' access levels. To request super-user access, the user responds with "enable" 175, to which the device responds with a second password prompt 180. If the user provides a recognized super-user password 185, the device grants this higher level access, and indicates the different access level with a different prompt symbol ("#") 190.

Often, the management of a network requires modification to many network devices. For example, to enhance security, the authentication parameters (username, password, community string) of some or all of the network devices may be changed periodically. Applying changes to many devices manually can be very tedious and error prone, and an automation of the process would reduce the tedium and errors. Other tasks, such as system diagnosis tasks that require knowledge of device configurations, would also benefit from automation tools that automatically collect such configuration information. However, to use such automation processes, access must be provided to each device being modified or monitored, and the disparate access protocols among device types introduces a substantial hurdle to such tasks.

It is an objective of this invention to provide a method and system to facilitate gaining access to a variety of different network devices. It is a further objective of this invention to provide a method and system to facilitate the creation of authentication/access protocol scripts for a variety of different network devices. It is a further objective of this invention to facilitate the creation of authentication/access protocol scripts to support future devices or standards.

These objects, and others, are achieved by a method and system that discovers and stores the proper access protocol for each device on a network. The discovery process includes progressively sequencing through state transitions until a successful access protocol sequence for a device is determined. When a successful access sequence is determined, a sequence script corresponding to this sequence is stored for subsequent access to the device. Preferably, the protocol-discovery algorithm is modeled as a state table that includes a start state and two possible terminal states: success and failure. A state machine executes the state table until a terminal state is reached; if the terminal state is a failure, the system backtracks to attempt an alternative sequence. The process continues until the success state is reached or until all possible sequences are executed without success. An exemplary state model is provided that has been shown to be effective for modeling network devices from a variety of vendor devices, as are techniques for generating protocol scripts based on this model, or others.

BRIEF DESCRIPTION OF THE DRAWINGS

The invention is explained in further detail, and by way of example, with reference to the accompanying drawings wherein:

FIGS. 1A and 1B illustrate example access protocol sequences for two different network devices;

FIG. 2 illustrates an example block/flow diagram for securing access to a typical network device;

FIGS. 3A and 3B illustrate example state diagrams corresponding to the access protocol sequences of FIGS. 1A and 1B;

FIG. 6 illustrates an example block diagram of a network device access system in accordance with this invention; and FIG. 7 illustrates an example access protocol script created in accordance with this invention.

Throughout the drawings, the same reference numerals indicate similar or corresponding features or functions. The drawings are included for illustrative purposes and are not intended to limit the scope of the invention.

DETAILED DESCRIPTION

Figure 4A:
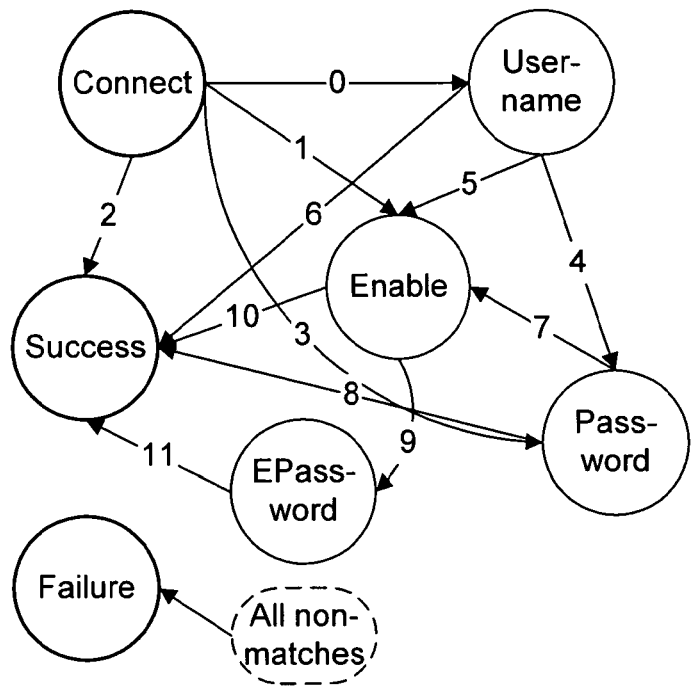
FIG. 4A illustrates an example model of a generic state diagram that can be used to represent a variety of access protocol sequences in accordance with this invention.

In the following description, for purposes of explanation rather than limitation, specific details are set forth such as the particular architecture, interfaces, techniques, etc., in order to provide a thorough understanding of the concepts of the invention. However, it will be apparent to those skilled in the art that the present invention may be practiced in other embodiments, which depart from these specific details. In like manner, the text of this description is directed to the example embodiments as illustrated in the Figures, and is not intended to limit the claimed invention beyond the limits expressly included in the claims. For purposes of simplicity and clarity, detailed descriptions of well-known devices, circuits, and methods are omitted so as not to obscure the description of the present invention with unnecessary detail.

FIG. 2 illustrates a typical authentication sequence between a network administrator's terminal 210, hereinafter the accessing system, and a network device 220. As noted above, this invention addresses the process of gaining access, typically privileged access, to devices on a network upon successful completion of an authentication process. The authentication process includes verifying the identity and legitimacy of a person or a process attempting to gain access to a network device, and includes the following processes:

Determine (211) whether the network device is accessible.
Identify (212) the authentication scheme to use to communicate with the network device, the most common being telnet, secure shell and SNMP.
Identify (213) the accessing entity to the network device, typically using a login and a password.
Acknowledging (214) authentication, typically by a change of prompting signals from the network device.

Before gaining control of a network device, the system determines whether the network device is accessible 211. There are many ways to determine if the network device is accessible, such as sending ICMP echo messages to the network device. In a preferred embodiment of this invention, a sequence of different techniques are attempted until a response is received, including ICMP echo, SNMP, and pinging for well-known ports. Examples of some of the well known ports include: port 7 assigned to echo port; port 23 used by telnet protocol; port 22 used by secure shell (ssh) protocol; and port 80 used by http protocol for web access.

After determining that the network device is accessible, the system determines the authentication scheme that is to be used 212, preferably including telnet, secure shell protocol, and the SNMP protocol. The system determines which of these authentication schemes are supported by the device and stores this information. If more than one authentication scheme is available for the network device, user defined priorities are used to select which access scheme to use.

Upon determination and/or selection of an authentication scheme, the system provides information to authenticate the system to the device 213. As noted above, the authentication protocol information and sequence varies among devices. Some network devices require only a password to gain control of the network device, whereas other devices require a username and password and, in some cases, an additional super-user or privileged password, to gain control of the network device. Other devices may only require a login name. The set of authentication information and the communication sequence/protocol is dependent on the particular device, and typically varies for each vendor and sometimes for each device type with a vendor's product line.

If the system properly identifies itself as being entitled to access to the network device, both the system and the network device agree upon the completion of the authentication process 214, and the network device provides control to the system to perform any further network management tasks. This transfer of control is generally signaled by the use of a different prompt symbol by the network device.

If the appropriate prompt is received by the system, the system proceeds to engage in privileged transactions 215, such as receiving or modifying the configuration of the device, receiving diagnostic information, and so on. On the other hand, if the authentication fails, the accessing system initiates another authentication script and reattempts the authentication 213.

As discussed above, the system of this invention attempts to gain access to a network device by executing, or attempting to execute, an authentication sequence that is appropriate for the given device. In accordance with an aspect of this invention, the system is configured to progressively attempt authentication by dynamically creating possible protocol scripts. The term script is used herein to identify the portion of the protocol sequence provided by the accessing system. As also noted above, the different authentication sequences include differences in both information content as well as the sequence used to provide the information sequence.

The authentication process can be modeled using a state transition model. FIGS. 3A and 3B illustrate, for example, state diagrams for the authentication sequences illustrated in FIGS. 1A and 1B, respectively. In each diagram, the initial start state is "C", the connected-to-device state, and either of two terminal states, S, the successful authentication state, and F, the failed authentication state. The reference numerals correspond to the reference numerals of FIGS. 1A and 1B, except that the initial digits "1" in FIGS. 1A, 1B are replaced by a "3" in FIGS. 3A, 3B.

In FIG. 3A, the receipt of a "login:" prompt 310 causes a transition to a state s1, wherein the system is expected to send something to the device in response to this prompt. At s1, the system sends a login name 315, and transitions to state s2, to wait for a response from the device. If a "password:" prompt 320 is received, the system transitions to S3, wherein it sends a password 325 and progresses to state S4 to await a response from the device. The receipt of a ">" prompt 340 signals successful completion of the authentication process, and the system transitions to the success state S.

If the appropriate "login:" 310, "password:" 320, and ">" 340 prompts are not received in the appropriate sequence of states, this indicates that the authentication process using this state diagram does not provide a successful access and the system enters a failed state F. This failure may be caused by any of a variety of causes, based on the responses from the device. The device may not send the anticipated response because an unauthorized login name 315 or password 325 had been sent by the system; or, the device may not send the anticipated response because it uses an access protocol that does not correspond to the state diagram of FIG. 3A. That is, for example, the device may be one that uses an access protocol corresponding to the state diagram of FIG. 3B.

FIG. 3B illustrates a state diagram corresponding to the access protocol sequence of FIG. 1B. As in FIG. 3A, the system receives prompts 360, 370, 380, and 390 from the device, and sends responses 365, 375, and 385 to the device, in the sequence of states from connect C to either of a success S or failure F state. As in FIG. 3A, an unexpected response from the device leads to a failed authentication F state, and this failure may be due to erroneous data being provided to the device, or due to fact that the device's access protocol does not correspond to this state diagram.

In a simple embodiment of this invention, a state diagram corresponding to each known device type can be created, and the system can be configured to execute these state diagrams in sequence. Each time a failure state is reached, a next state diagram is initiated until a success state is eventually reached, or until all state diagrams have been attempted.

In accordance with another aspect of this invention, a 'universal' state diagram model is defined, and the system is configured to execute this state diagram to discover the access sequence for each device; when the proper access sequence for each device is discovered, the script that effects this sequence is saved for subsequent access to the device.

In a preferred embodiment, each step in the authentication procedure is modeled as a State "s" in the model. Each state "s" is associated with an Action "a" to be performed on the network device and a response "r" returned by the network device for the executed action. All the possible states constitute the State Set, $S=\{s_1, s_2, \ldots, s_n\}$. All the possible actions constitute the Action Set, $A=\{a_1, a_2, \ldots, a_m\}$. There is a one-to-many correspondence between the actions and the states, i.e., an action can be associated with more than one state. The set of accepted state transitions is defined as "$T=\{{}^w p_{(a,r)} \rightarrow q\}$, p, q $\in$ S and p$\neq$q, a $\in$ A, r is the response received from the network device and w is the weight associated with making the state transition. The possible state transitions chosen from a given state is dependent on the response received and action performed at that state. Each response can be associated with multiple state transitions. To accommodate this, each state transition "t" is associated with a weight "w". The weight helps in determining the choices made with respect to the state transitions at each state. The lower the weight the higher the priority choosing that state transition. The set of possible states and its associated actions along with the set of accepted state transitions collectively form the state machine. A device access script is defined as the set of state transitions performed to take the process from the Connect state to either a Success or Failure state.

Figure 4B:
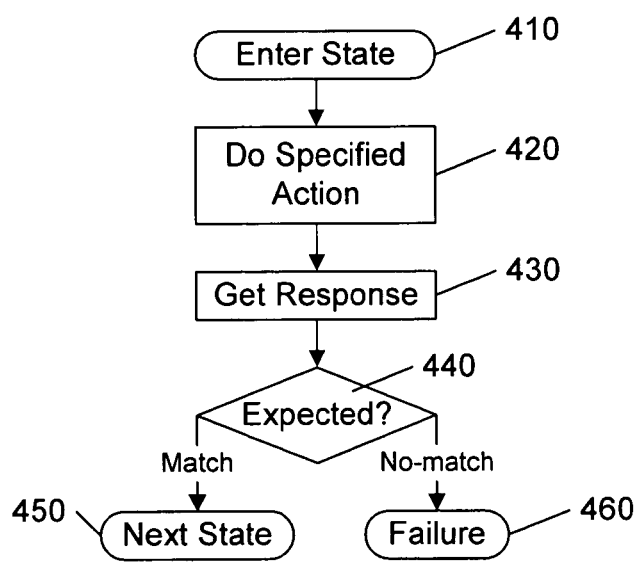
FIG. 4B illustrates an example flow diagram of the process within each state.

FIG. 4A illustrates an example universal state diagram model that has been found to be effective for modeling the access protocol for an extensive variety of network devices. Using seven defined states, it has been found that a set of transitions between these states can be found to model the access protocol for all network devices tested thus far. One of ordinary skill in the art will recognize that if a new state is required for modeling the access protocol of a newly released device, or of a new access protocol standard, it can easily be added. One of ordinary skill in the art will also recognize that another universal state diagram may be developed for use in a script generating system of this invention. For example, the state diagrams of FIGS. 3A and 3B defines a state uniquely for each reception state, waiting for a prompt from the device, and each transmission state, generating a response to the device. As discussed further below, recognizing that the access protocols generally include a prompt-response pair, the exemplary universal model uses states that include such pairs. FIG. 4B illustrates the actions performed within a state, and the transition to subsequent states, and is discussed further below.

The seven states used in the example universal model of access protocols are defined below.

Connect State: This is the initial state in the generation of the device access script. In this state a connection is established with the network device using one of the pre-determined authentication schemes. Once the connection is established, we wait for the initial prompt sent by the network device.

Username State: In this state, the process sends the username to the network device for authentication. Once the username is sent the network device generally prompts for the "Password" associated with the username.

Password State: In this state, the process sends the password to the network device for authentication. Once the password is authenticated against the network device, the network device generally responds back with the prompt that signals authenticated access, and gives control to the user. Although most of the network devices associate a password along with a username, there are many network devices that do not follow this, such as the device of FIG. 1B.

Enable State: In this state, the process sends the command that enables advancing to a higher access level of the network device, to request for super user privileges to the network device.

Enable Password State or Privileged Password State: In this state, the process sends the enable password to the network device. Once the network device authenticates the enable password, it generally grants super user privileges to the process.

Failure State: If for any reason, the network device reports errors or does not support any of the commands, it informs the process about the errors. This results in the process unable to complete the authentication procedure and results in the failure state. This state may include an action to record the sequence that led to this state, for diagnostic purposes, as discussed further below.

Success State: This is the final state in the successful generation of the device access protocol script. Once the process has reached this state, it has found the set of state transitions that will lead to a successful authentication procedure. Preferably, this state includes an action to record an identifier of the device and the sequence that led to this state, to facilitate creation of an access protocol script for this device, as discussed further below.

A variety of possible transitions between states are identified in the model of FIG. 4A, numbered from 0 to 11. Consider, for example, using the state diagram model of FIG. 4A, with the internal operation in each state conforming to FIG. 4B. As illustrated in FIG. 4B, each state will be defined to have a set of specified actions 420 to perform in this state, and a set of expected responses 440 associated with each potential next state 450. Each of the possible transitions identified in FIG. 4A will have one or more defined action-response pairs, $T=\{{}^w p_{(a,r)} \rightarrow q\}$, as discussed above. This example includes only twelve transitions, but one of ordinary skill in the art will recognize that the number of states, and thus the number of possible transitions, is virtually unbounded; in this example of seven states, the number of possible transitions to a different state from each state is six, and therefore the number of total possible transitions is 42 (6*7).

At 410 of FIG. 4B, the system enters the Connect state, wherein, for a possible transition to the Username state identifies an action of establishing a telnet authentication scheme, and expect a "login:" response (110 of FIG. 1A). If the target device corresponds to the device in the example of FIG. 1A, the response 110 is a "login:" prompt, and therefore the system will identify the "login:" prompt as the expected prompt 440 for branching to the Username state as a next state 450, as indicated by the transition 0 in FIG. 4A. If a different prompt is received, a failure 460 is encountered, and the system will proceed to test another transition (1, 2, 3) from the Connect state, using the corresponding action-expected response pair $T=\{{}^w p_{(a,r)} \rightarrow q\}$. As noted above, each transition T includes a weight w, and this weight is used to determine the order used to test each transition.

Continuing the example of a device that uses an access protocol as illustrated in FIG. 1A, the system enters the Username state at 410, wherein the associated action-response pair for transitioning to the Password state includes the action

420 of sending of the user name, and an expected response of a "password:" prompt (120 in FIG. 1). If this response is received after sending the user name, the system transitions to the Password state, via the transition 4 of FIG. 4A. Otherwise, at 440, the system transitions to the failure state 460, and the next possible transition from the Username state is attempted. That is, based on the response received from the device, the system transitions to the appropriate state based on the match criteria and the associated weight. If the response received matches a condition for transitioning to the next state, then the system would transitions to that state. However, if the response does not match, the system transitions to the Failure State, thereby acknowledging and marking that the sequence of steps taken thus far will not lead to a successful access protocol. Thereafter, the other possible sequences are attempted, to find a successful access protocol, if one exists. As noted above, the weight associated with the transitions determines the order in which each transition is attempted. One of ordinary skill in the art will recognize that any of a variety of backtracking schemes may be used after reaching the failure state 460, using, for example, heuristic techniques to determine which alternative states may provide a greater likelihood of success.

From the Password state of FIG. 4A, a transition to the success state includes an action-response pair wherein the action is the sending of a password (125 in FIG. 1), and receipt of a authentication prompt "#" 140. If the authentication prompt 140 is received, the system transitions to the Success state as the next state 450, via transition 8 of FIG. 4A, thereby completing a successful access authentication. The successful transitions, i.e. the states visited along the way to the success state, 0-4-8 define a script that can be stored associated with the device for which the successful access authentication was achieved, thereby eliminating the need to execute the model of FIG. 4A to rediscover this script. That is, the transitions 0-4-8 correspond to a script of:

set up telnet authentication, receive "login:" prompt (transition 0);

send user name, receive "password:" prompt (transition 4); and send password name, receive "#" prompt (transition 8).

Note that a device having an access protocol of FIG. 1B would not provide the same responses, the system would not provide the same actions, and the set of transitions to achieve a success state will differ from the prior example, and therefore a different script will be produced. For example, gaining access to the device using the access protocol of FIG. 1B would progress through transitions 3-7-9-11 in FIG. 4A, and a script corresponding to the action-response pairs of these transitions would be stored for that device (FIG. 7, discussed below).

In a preferred embodiment, it has been found that the primary device-related actions associated with each transition can be modeled as one of the following four actions.

Connect Action: This action is executed only in the Connect State. A connection to the network device is activated based on the pre-determined authentication scheme. The network device responds with the initial prompt, which is stored as the response as part of an action-response pair that defines a transition from this state.

Disconnect Action: This action is executed upon reaching the Success State, or after exhausting all access attempts. Typically, the discovery, creation, and storage of an access protocol for a network device is conducted as an independent action, and therefore the connection that was established to the device during this process can be disconnected once the protocol is successfully discovered, or upon exhausting all possibilities. This action also typically includes the storage of the access protocol, with appropriate linkage to the network device, if the access was successful, or the storage of diagnostic information, if the access was unsuccessful, and other administrative tasks.

Send Action: This is the most common action performed at the various states. The action includes sending a response/command to the network device. Once the network device processes the response/command, it is expected to send its response, typically in the form of a prompt.

No Action: Some states may not require an action to be performed with regard to the network device, such as the failure state.

As noted above, the universal model of FIG. 4A has been found to be effective for discovering access protocols for a wide variety of network devices. However, as new devices are made available, or new standards are developed for network management, the details of the model may change, or it may be replaced entirely in an alternative application. In a preferred embodiment, the model used to discover access protocols is stored in a text file that facilitates such changes. Preferably, the text is organized in a structured manner, to facilitate diagnosis and maintenance of the model.

Figure 5:
FIG. 5 illustrates an extract of an example XML file that serves to describe an example universal access protocol model.

FIG. 5 illustrates an example extract of an XML (Extensible Markup Language) file that facilitates the creation and alteration of a universal model in accordance with this invention.

In this example embodiment, the actions for each state are stored independent of the transition conditions of each state, because as noted above, in the example embodiment, entry into a given state effects the action, regardless of the subsequent response from the device. Alternative structures to support different state-action-response-transition relationships will be evident to one of ordinary skill in the art. The segment 510 illustrates the definition of the action to be performed upon entering the USERNAME_STATE 511. The action is a SEND_ACTION 512, defined above as the sending of a response/command to the network device, which response/command in this example is the $USERNAME 513, the "$" indicating an indirect access to a location that contains the accessing system's user name. Not illustrated, if the user uses different user names for different devices, a preprocessor will typically be configured to load the appropriate user name at this defined location at the start of the discovery process for each target device.

The segments 520 and 530 illustrate example definitions of transitions, corresponding to transitions 4 and 5 in FIG. 4A. At segment 520, identified as StateTransition_4 521, the "from" state for this transition is identified as USERNAME_STATE 522, corresponding to the Username state in FIG. 4A, and the "to" state for this transition (corresponding to "Next State" 450 in FIG. 4B) is identified as PASSWORD_STATE 523, corresponding to the Password state in FIG. 4A. The same "from" state USERNAME_STATE is identified at 532 in segment 530, StateTransition_5 531, but a different "to" state, ENABLE_STATE 533 is identified as the next state.

To effect StateTransition_4 521, from the USERNAME_STATE 522 to the PASSWORD_STATE 523, the received response must match the match conditions 524, corresponding to the "expected?" test 440 of FIG. 4B. In this example, a vertical bar "|" is used to indicate alternative matching responses; in this case, either "password:" or "enter password:" would be acceptable responses to effect the transition to PASSWORD_STATE 523, corresponding to transition 4 in FIG. 4A. In a preferred embodiment, the match conditions 524 may also include "wild card" matching, so that an exact match of each character in the response need not be required.

If the "password:" or "enter password:" response is not received, the system will check for other possible matches, corresponding to other transitions. At segment 530, "StateTransition_5" 531, the match condition for transitioning to the "ENABLE STATE" 533 is given as a "&" 534; if a "&" is received from the device while in the "USERNAME STATE" 532, the system will transition to the "ENABLE STATE", corresponding to transition 5 in FIG. 4A.

As noted above, each transition is allocated a weight for determining the order in which to attempt each transition. If the match conditions of each transition are disjoint, such as match conditions 524 and 534, the priority has no effect, because only the transition that includes a match to the received response will be enabled, regardless of order in which the transitions/matchings are attempted. However, if different transitions from the same state include one or more common match conditions, such as match conditions 534 and 544, and the response corresponds to a common match condition, such as in the above example of receiving a "&" response, the first attempted transition will be the first executed transition. In this example, StateTransition_5 531 is given a priority of "50" 535, and StateTransition_6 541 is given a priority of "70" 545, and therefore StateTransition_5 will be attempted first. This choice of giving priority to StateTransition_5 531 may be based on a variety of factors; in this example, entry to the "ENABLE_STATE" is preferable because, as discussed above, the "ENABLE_STATE" allows the system to attempt to gain 'superuser' access to the device. If this attempt to gain 'superuser' access fails, the system will backtrack and eventually reenter the "USERNAME_STATE". Upon reentry, the system will have recorded that StateTransition_5 was unsuccessful, will attempt StateTransistion_6, and, upon receipt of an "&", will transition to the "SUCCESS_STATE" 543, corresponding to transition 6 in FIG. 4A.

The choice of priorities may also be based on other factors, such as heuristics that indicate likely paths to the success state, such as a heuristic that indicates that most device access protocols call for a password after providing a username, or, the priority may be based on heuristics specific to the particular network, and so on. For example, most networks include common families of devices, because the same vendor is generally used when networks are initially created. If it is known or determinable that a particular network primarily contains devices with a more common protocol, the priority of transitions corresponding to this protocol may be given a higher priority. Similarly, some transitions may be identified as a 'last resort', wherein even though the transition may eventually lead to a success state, other transitions are always preferred.

One of ordinary skill in the art will recognize that other priority schemes may be used as well; for example, the order in which the state transition definitions appear in the model could determine which transitions are attempted first, and so on. Similarly, one of ordinary skill in the art will recognize that the priority parameter need not be 'static', and heuristics and other learning system techniques can be used to dynamically adjust the priority ordering based on experiences within a given network or other factors.

FIG. 6 illustrates an example embodiment of an automated access system in accordance with this invention.

An accessing system 630 is preferably configured to determine whether a device access script 650 is available for accessing a target network device 640. If the script is available, it is used to access the device 640; otherwise, the accessing system 630 is configured to use an access protocol discovery module 620 to discover the access protocol for the target device 640.

The access protocol discovery module 620 is configured to use the information contained in a universal access protocol model 610 to discover a viable access protocol sequence for accessing a network device 640 from an accessing system 630, as detailed above. When a successful access protocol is found, it is stored as a device access script 650 for subsequent access to this device. For example, an access file may be maintained that includes the IP address of each device 640 in the network, and a pointer to a device access script 650 for this device. Optionally, the device type or device model name may be stored, as well, so that other devices on the network corresponding to this type or model may also use the same device access script in lieu of discovering the access protocol for each of these devices.

An example device access script 650 is illustrated as a structured text file in FIG. 7. This model corresponds to the access protocol illustrated in FIG. 1B, corresponding to a discovered 3-7-9-11 transition sequence of FIG. 4A. The script is processed sequentially. The system is initialized to the Connect state 710, and awaits a prompt from the device. If the received prompt matches the expected "password:" or "enter password:" prompt 720, the system proceeds (transition 3 in FIG. 4A) to the Password state 730, wherein it sends the password 731, and awaits one of the expected prompts 732. Implicit in this script, if the expected prompt is not encountered, the accessing system 630 in FIG. 6 notifies the user of an anomaly, because this script had previously been successful for accessing the device. Barring such anomalies, the system progresses to the Enable state (transition 7) 740, to the Enable_Password state (transition 9) 750, and on to a successful access (transition 11).

In a preferred embodiment of this invention, the access protocol discovery module 620 is configured to proceed through the various states of the access protocol model 610 until the success state is reached, or until a failure is reached. If a failure occurs, the system backtracks to the last state that has a not-yet-tried transition for the current sequence. For example, if the system progresses to the Enable state in FIG. 4A, based on a successful transition 0—transition 4—transition 7 sequence, and then fails, the system will backtrack to the Password state, and attempt transition 8, in lieu of the prior transition 7. If this is unsuccessful, the system backtracks further, to the Username state, and attempts transition 5, in lieu of the prior transition 4, and so on. Alternatively, if, for example, the network devices require a reset to an initial state to restart a sequence, the system may be configured to restart from the Connect state whenever the Failure state is reached, having kept a record of each prior sequence that was unsuccessful.

Also in a preferred embodiment, the record of one or more of the attempted sequences for a given device is stored (690 in FIG. 6), and deleted whenever the sequence discoverer 620 finds a successful sequence. In this manner, the sequences 690 will correspond to attempts to connect to a currently inaccessible device 640. These sequences 690 have been found to be effective for diagnosing an inability to access a device 640. Generally, the longest sequence associated with any inaccessible device is typically of particular interest, because long sequences generally terminate at a state close to the Success state. The device response that caused the transition to the Failure state is recorded with the sequence of transitions, so that the user can identify the problem, and, if appropriate, modify the protocol model 610 to include this last response as an expected response.

The foregoing merely illustrates the principles of the invention. It will thus be appreciated that those skilled in the art will be able to devise various arrangements which, although not explicitly described or shown herein, embody the principles of the invention and are thus within the spirit and scope of the following claims.

In interpreting these claims, it should be understood that:
a) the word "comprising" does not exclude the presence of other elements or acts than those listed in a given claim;
b) the word "a" or "an" preceding an element does not exclude the presence of a plurality of such elements;
c) any reference signs in the claims do not limit their scope;
d) several "means" may be represented by the same item or hardware or software implemented structure or function;
e) each of the disclosed elements may be comprised of hardware portions (e.g., including discrete and integrated electronic circuitry), software portions (e.g., computer programming), and any combination thereof;
f) hardware portions may be comprised of one or both of analog and digital portions;
g) any of the disclosed devices or portions thereof may be combined together or separated into further portions unless specifically stated otherwise;
h) no specific sequence of acts is intended to be required unless specifically indicated; and
i) the term "plurality of" an element includes two or more of the claimed element, and does not imply any particular range of number of elements; that is, a plurality of elements can be as few as two elements, and can include an immeasurable number of elements.

What is claimed is:

1. A method of discovering, by a first device, an authentication protocol used by a second device in a network, wherein the authentication protocol defines a sequence of actions required to successfully authenticate with the second device, said method comprising:
    establishing, by the first device, a connection with the second device;
    accessing, by the first device, a model of a plurality of authentication protocols;
    executing, by the first device, a plurality of actions based on the model until the first device successfully authenticates with the second device; and
    recording, by the first device, a sequence of the actions that resulted in successful authentication with the second device;
    wherein:
    the model comprises a plurality of states and the model transitions from one state to another state when initiated by a transition; and
    each authentication protocol is defined by a sequence of transitions between select states in the model.

2. The method of claim 1, wherein establishing the connection with the second device comprises determining whether the second device is accessible by the first device.

3. The method of claim 1, wherein the states of the model comprise:
    a first state that serves as an initial state of the sequence,
    a second state wherein an identification of a user is communicated to the second device,
    a third state wherein a password of the user is communicated to the second device,
    a fourth state wherein a command is communicated to the second device, requesting that a higher level of access by enabled, and
    a fifth state wherein a second password of the user is communicated to the second device to gain the higher level of access.

4. The method of claim 3, wherein the states of the model further comprise:
    a sixth state that identifies a final state of the sequence that defines an authentication protocol, and
    a seventh state that identifies a final state of a sequence that does not define an authentication protocol.

5. The method of claim 3, wherein the model includes a plurality of action-response pairs that define the transitions between the states.

6. The method of claim 5, further comprising:
    upon entering at least one state of the plurality of states, executing an action of an action-response pair corresponding to a transition from the state;
    receiving a device response from the device; and
    transitioning to a next state based on whether the device response corresponds to an expected response of the action-response pair.

7. The method of claim 6, further comprising transitioning to the next state based on a priority associated with each of the plurality of transitions, and wherein the expected response corresponds to a plurality of transitions from the state.

8. The method of claim 3, wherein at least one state includes a plurality of possible transitions, and each transition of the possible transitions includes a parameter that affects an order in which the possible transitions are selected for consideration within the state.

9. The method of claim 8, modifying the parameter that affects the order in which the possible transitions are selected for consideration based on prior access attempts.

10. A method of authenticating with a plurality of devices in a network, said method comprising:
    establishing respective connections with the devices in the network;
    determining, for each device, an access protocol based on information recorded in an access file, wherein the access file is maintained by a discovery system that discovered the access protocol used by each device based on a model of a plurality of access protocols; and
    authenticating with the devices in the network based on the access protocol indicated by the information from the access file;
    wherein:
    the model comprises a plurality of states and the model transitions from one state to another state when initiated by a transition; and
    each access protocol is defined by a sequence of transitions between select states in the model.

11. The method of claim 10, wherein authenticating with the devices in the network comprises determining an address of at least one of the devices in the network and determining at least one access protocol from the access file based on the address.

12. The method of claim 10, wherein authenticating with the devices in the network comprises determining a device type for at least one of the devices in the network and determining at least one access protocol from the access file based on the device type.

13. The method of claim 10, wherein authenticating with the devices in the network comprises determining a model name for at least one of the devices in the network and determining at least one access protocol from the access file based on the model name.

14. A discovery system configured to discover an authentication protocol used by devices in a network, said system comprising:
an interface, coupled to the network, for establishing a connection with devices in the network;
a storage configured to provide a model for a plurality of authentication protocols; and
a processor, configured by executable program code, to execute a plurality of actions based on the model until the system successfully authenticates with the devices in the network, and record information indicating which sequences of actions resulted in successful authentications;
wherein:
the model comprises a plurality of states and the model transitions from one state to another state when initiated by a transition; and
each authentication protocol is defined by a sequence of transitions between select states in the model.

15. The discovery system of claim 14, wherein the processor is configured to provide information indicating authentication protocols of the devices in the network responsive to a request by another system.

16. The discovery system of claim 4, wherein the processor is configured to record information indicating an address in the network for the devices and a pointer to each of the sequences that resulted in successful authentication.

17. The discovery system of claim 14, wherein the processor is configured to record information indicating a device type for the devices in the network.

18. The discovery system of claim 14, wherein the processor is configured to record information indicating a model name for the devices in the network.

19. The system of claim 14, wherein the model comprises a plurality of states, and each authentication protocol is defined by a sequence of transitions between select states.

20. The system of claim 14, wherein the states of the model comprise:
a first state that serves as an initial state of the sequence,
a second state wherein an identification of a user is communicated to the second device,
a third state wherein a password of the user is communicated to the second device,
a fourth state wherein a command is communicated to the second device, requesting that a higher level of access by enabled, and
a fifth state wherein a second password of the user is communicated to the second device to gain the higher level of access.

21. The system of claim 20, wherein the states of the model further comprise:
a sixth state that identifies a final state of the sequence that defines an authentication protocol, and
a seventh state that identifies a final state of a sequence that does not define an authentication protocol.

22. The system of claim 14, wherein the model includes a plurality of action-response pairs that define the transitions between the states.

23. The system of claim 14, wherein at least one state includes a plurality of possible transitions, and each transition of the possible transitions includes a parameter that affects an order in which the possible transitions are selected for consideration within the state.

24. The system of claim 23, wherein the processor is configured to modify the parameter that affects the order in which the possible transitions are selected for consideration based on prior access attempts.

* * * * *